United States Patent [19]
Zushi et al.

[11] Patent Number: 5,574,074
[45] Date of Patent: Nov. 12, 1996

[54] FOAMABLE ORGANIC POLYMER COMPOSITION AND PRODUCTION OF FOAMED ARTICLE

[75] Inventors: Toshihiro Zushi; Takashi Higashikubo; Tamotsu Kaide; Takuma Takai; Makoto Wada, all of Amagasaki; Kaneharu Suga, Itami, all of Japan

[73] Assignee: Mitsubishi Cable Industries, Inc., Amagasaki, Japan

[21] Appl. No.: 197,884

[22] Filed: Feb. 17, 1994

[30] Foreign Application Priority Data

Feb. 19, 1993 [JP] Japan ..................................... 5-030507
Jul. 6, 1993 [JP] Japan ..................................... 5-166714

[51] Int. Cl.$^6$ ...................................................... C08J 9/10
[52] U.S. Cl. ........................... 521/143; 521/97; 521/123; 521/128; 521/130; 521/133
[58] Field of Search .............................. 521/97, 128, 133, 521/142, 143, 123, 130

[56] References Cited

U.S. PATENT DOCUMENTS

| | | | |
|---|---|---|---|
| 4,344,710 | 8/1982 | Johnson et al. . | |
| 4,683,247 | 7/1987 | Allen et al. | 521/91 |
| 5,180,754 | 1/1993 | Morita et al. | 521/85 |
| 5,210,377 | 5/1993 | Kennedy et al. | 174/107 |

FOREIGN PATENT DOCUMENTS

| | | |
|---|---|---|
| 47-026171 | 12/1972 | Japan . |
| 61-168634 | 7/1986 | Japan . |
| 61-168634 | 7/1986 | Japan . |
| 2-272039 | 11/1990 | Japan . |
| 2272034 | 11/1990 | Japan . |

*Primary Examiner*—James J. Seidleck
*Assistant Examiner*—John M. Cooney, Jr.
*Attorney, Agent, or Firm*—Varndell Legal Group

[57] ABSTRACT

A foamable organic composition comprising a compound foamable to 50% or more comprising an organic polymer and a chemical foaming agent, and, as a physical foaming agent, at least one member selected from the group consisting of rare gases and carbon dioxide; and a method for producing a foamed article having a high expansion ratio by using said composition. According to the present invention, a foamed article having a uniform and fine foam structure and a high expansion ratio of not less than 75% (which is as high as when freon gas is used) can be obtained without causing environmental problems such as depletion of the ozon layer. When applied, in particular, to a foamed layer for an insulated conductor, such as foam-insulated electric wire which is required to have high performance insulation and is occasionally installed under severe conditions, the composition of the present invention advantageously provides an insulated conductor with no potential buckling.

6 Claims, 2 Drawing Sheets

FOAMABLE ORGANIC POLYMER COMPOSITION AND PRODUCTION OF FOAMED ARTICLE

FIELD OF THE INVENTION

The present invention relates to a foamable organic polymer composition capable of forming a uniform and fine foam having a high expansion ratio of, for example, not less than 75%, which is suited for use as an insulating layer of coaxial cables, and to the production of a foamed article using said composition.

BACKGROUND OF THE INVENTION

Traditionally, various fluorocarbon gases (freon) have been used as foaming agents to obtain foamed articles having high expansion ratios. The use of freon is, however, gradually restricted in view of its harmful influence to the environment, such as depletion of the ozone layer.

While there have been studied various foaming agents to take the place of freon, they are associated with difficulties in obtaining an article foamed in a uniform fashion and having a high expansion ratio. Accordingly, a method for producing, without using freon, a uniformly and finely-foamed article having a high expansion ratio, which causes no environmental problems such as depletion of the ozone layer, or a foamable composition capable of providing such foamed article is demanded.

SUMMARY OF THE INVENTION

The present invention relates to a foamable organic polymer composition comprising a compound (A) foamable to 50% or more comprising an organic polymer (A-1) and a chemical foaming agent (A-2), and, as a physical foaming agent, at least one member (B) selected from the group consisting of rare gases and carbon dioxide; and to a method for producing a foamed article having a high expansion ratio by using said composition.

DETAILED DESCRIPTION OF THE INVENTION

Figure 1:
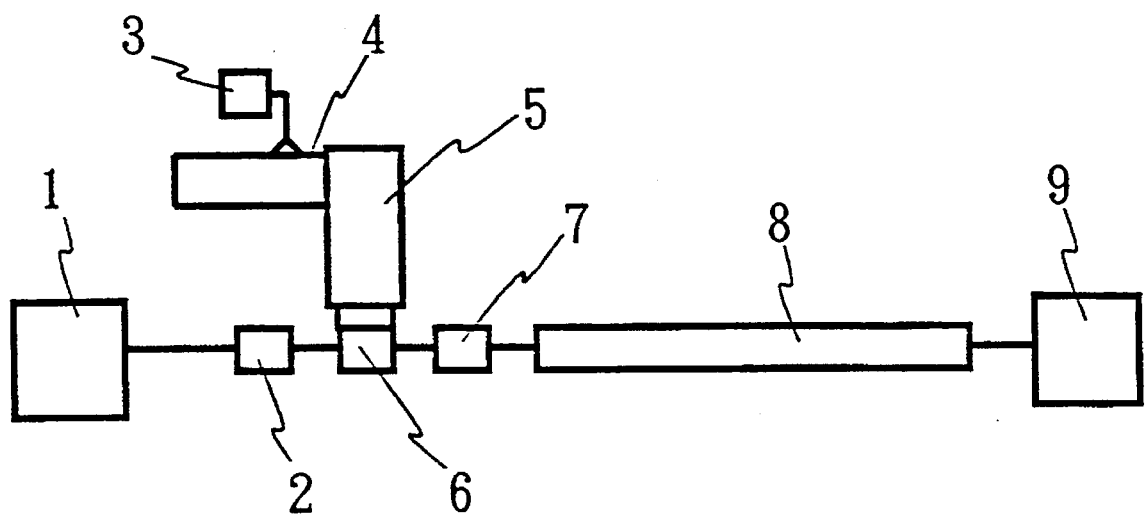
FIG. 1 shows one embodiment of the extrusion foaming of the present invention.

The physical foaming agent (B) to be used in the present invention is at least one member selected from the group consisting of rare gases of helium, neon, argon, cripton, xenon and radon, and carbon dioxide. Specifically, argon gas is desirable in that foams having higher expansion ratios and higher levels of uniformity can be obtained, that it does not destroy the ozone layer as do freons, that it is extremely stable and does not react chemically, and that it is free of explosion.

As used herein, the expansion ratio was measured by specific gravity method and is defined by the following formula:

$$\text{Expansion ratio (\%)} = \frac{\rho_0 - \rho}{\rho} \times 100$$

wherein $\rho_o$ is the density of a polymer before foaming and $\rho$ is the density of the obtained foam.

When a mixed gas of a rare gas and carbon dioxide is used as a (B) component, the ratio (volume ratio) of the two ingredients is preferably 30:70–70:30, more preferably 40:60–60:40 (rare gas:carbon dioxide). The rare gas and/or carbon dioxide may contain a small volume of nitrogen, preferably in a proportion of not more than 30% by volume relative to the rare gas and/or the carbon dioxide.

The purity of the (B) component is preferably 99.9% or above and more preferably 99.99% or above.

The compound (A) foamable to 50% or more to be used in the present invention is a mixture of an organic polymer (A-1) to be foamed and a large amount of a chemical foaming agent (A-2), which produces, when the compound is allowed to foam under the known extrusion foaming conditions, a foam having an expansion ratio of not less than 50% by the action of the chemical foaming agent contained therein even without the help of a physical foaming agent. In the present invention, a compound foamable to 60% or more, particularly, a compound foamable to 70% or more in the same definitive sense is preferentially used.

Examples of the organic polymer (A-1) to be used in the (A) component include thermoplastic resins such as olefin resins, polystyrene, polyvinyl chloride, polyamide, polyurethane elastomers and fluorocarbon resins. Of these, olefin resins are preferable, with particular preference given to polyethylene. These resins are used alone or in combination.

Examples of the polyethylene include very low density polyethylene (V-LDPE), low density polyethylene (LDPE), high density polyethylene (HDPE), ethylene-ethyl acrylate copolymers, ethylene-vinyl acetate copolymers and mixtures thereof, with no particular limitation. Specifically, HDPE alone, LDPE alone, and HDPE and LDPE in combination are highly preferable.

As used herein, LDPE refers to those having a density falling within the range of from 0.89 to 0.935, particularly from 0.91 to 0.926; and HDPE refers to those having a density falling within the range of from 0.94 to 0.96.

The preferable range of melt flow rate (hereinafter abbreviated as MFR) of the aforesaid olefin resins is, for example, 0.1–5 g/10 min, preferably 0.5–3.0 g/10 min for polyethylene, 0.1–10 g/10 min, preferably 0.3–5.0 g/10 min for polypropylene, and 0.1–10 g/10 min, preferably 0.3–5.0 g/10 min for propylene/ethylene copolymer. In the present invention, was measured according to JIS K7210, wherein the measurement conditions were: load 2.16 kg and temperature 190° C. for polyethylene and load 2.16 kg and temperature 230° C. for polypropylene and propylene/ethylene copolymer.

Swelling ratio is preferably about 30–80%, more preferably 45–80%, most preferably 50–70% for the (A-1) component. As used herein, the swelling ratio is as defined in Japanese Patent Publication No. 11412/1986 at column 3, lines 9–12 and column 4, lines 1–8 and others, and is measured under the conditions described in said gazette.

The molecular weight distribution of the olefin resins preferably has some width to achieve a greater melt tension which affords a uniformly foamed article with a high expansion ratio.

The MFR range of the HDPE/LDPE mixture is preferably from 0.1 to 5.0 g/10 min, more preferably from 0.5 to 3.0 g/10 min.

Examples of the chemical foaming agent (A-2) (which is the other member constituting the (A) component) include those which are self-decomposable with heat etc. to generate gases, such as organic foaming agents and inorganic decomposable compounds. The chemical foaming agent (A-2) is appropriately selected from among known foaming agents, depending on melt temperature, melt viscosity etc. of the polymer (A-1) to be used. For example, azodicarbonamide (ADCA), azobisisobutyronitrile (AIBN), N,N'-dinitrosopentamethylenetetramine (DPT), p-toluenesulfonylhydrazide (TSH), 4,4'-oxybisbenzene sulfonylhydrazide (OBSH), sodium bicarbonate and/or ammonium carbonate are/is used. When polyethylene is used, OBSH, ADCA or a mixture thereof is preferable in that a particularly high expansion ratio can be achieved.

The ratio of the (A-2) component to the (A-1) component in the (A) component varies depending on the kind of the organic polymer or the chemical foaming agent to be used. In general, the proportion of the (A-2) component to the (A-1) component is 1.5–20.0% by weight, preferably 1.6–18.0% by weight in case of a compound foamable to 50% or more. Specifically, the proportion of the (A-2) component to the (A-1) component is 1.5–10.0% by weight, preferably 1.6–5.0% by weight in case of a compound foamable to not less than 50% and less than 60%; 1.6–15.0% by weight, preferably 1.8–10.0% by weight in case of a compound foamable to not less than 60% and less than 70%; and 1.9–20.0% by weight, preferably 2.0–18.0% by weight in case of a compound foamable to not less than 70%.

The (A) component is exemplified by WN866 (manufactured by Nippon Unika, Japan) for a compound foamable to 70%, UBEC-481 and UBEC-485 (manufactured by Ube Kosan, Japan) for a compound foamable to 60%, and DFDJ-4960 (manufactured by Nippon Unika, Japan) for a compound foamable to 50%.

A finely-foamed article with a high expansion ratio of not less than 75% and a uniform foam structure can be obtained by admixing the (B) component with the aforementioned (A) component to allow foaming.

In accordance with the present invention, there is provided a foamed article having, not to mention a high expansion ratio, high surface smoothness and increased hardness as well, by adding an unfoamable organic polymer (C) to the (A) component and adding the (B) component to said mixture. As a result, the obtained article has an improved resistance to buckling and an improved heat resistance.

Examples of the (C) component include thermoplastic resins such as olefin resins, polystyrene, vinyl chloride, polyamide, polyurethane elastomers and fluorocarbon resins, which may be the same as or different from the (A-1) component. When the same kind of the organic polymer used as the (A-1) component is used as the (C) component, preferable results can be obtained. When polyethylene is used as the (A-1) component, for example, the (C) component is preferably also polyethylene. When polyethylene is used for both the (A-1) component and the (C) component, the preferable combination is LDPE of (A-1) and HDPE of (C); HDPE of (A-1) and LDPE of (C); and HDPE or LDPE for both (A-1) and (C) with different densities between the two. In particular, it is preferable that (A-1) should have a lower density than that of (C).

The proportion of the (A) component and the (C) component varies depending on the kinds of resins and foaming agents to be used and the desired expansion ratio. The ratio of (A) component:(C) component (by weight) is generally 100:10–10:100, preferably 100:15–15:100, more preferably 100:20–20:100.

Swelling ratio is preferably about 30–80%, more preferably 45–80%, most preferably 50–70% for a mixture of the components (A-1) and (C).

The foamable composition particularly preferable in the present invention comprises a compound (A) foamable to 50% or more which comprises LDPE (A-1) and a chemical foaming agent (A-2), HDPE (C) and a physical foaming agent (B), wherein the weight ratio of (A):(C) is 20:80–80:20, preferably 30:70–70:30: or comprises a compound (A) foamable to 50% or more which comprises HDPE (A-1) and a chemical foaming agent (A-2), LDPE (C) and a physical foaming agent (B), wherein the weight ratio of (A):(C) is 20:80–80:20, preferably 30:70–70:30.

The foamable composition of the present invention may contain a nucleator. Examples of the nucleator include inorganic particles such as silicon oxide and boron nitride (BN), and/or chemical foaming agents which are generally considered to also act as a nucleator. The nucleator is used in an amount of 0.1–10 parts, preferably 0.2–5 parts, more preferably 0.3–3 parts by weight based on 100 parts by weight of the organic polymer in the composition.

The nucleator is preferably mixed with the (A) component or with the (A) component and the (C) component prior to being fed into an extruder.

The amount of the (B) component varies depending on its kind and the (A) component and the (C) component to be used. Generally, it is 0.005–2 parts, preferably 0.1–0.5 part by weight based on 100 parts by weight of the organic polymer in the composition.

The foamable composition of the present invention may contain additives such as copper inhibitor, antioxidant and coloring agent on demand.

According to the present invention, an extrusion foaming is the preferable mode of production. Above all, a method comprising extrusion foaming of a foamable composition on a conductor to provide a foamed insulation thereon for the production of coaxial cable for communicating use is particularly preferable.

Alternatively, a foamed structure insulating layer is formed as the foamable composition is applied to a conductor by extrusion foaming so as to form an insulating layer on the conductor. For example, an (A) component or a mixture of an (A) component and a (C) component is supplied to an extruder; a (B) component is forced into a barrel of the extruder from a foaming agent inlet provided separately; the components are mixed in the barrel to give a foamable composition; the composition is extrusion foamed on a conductor to form an insulated conductor applied with a foamed insulation. The foamed insulation thus applied may undergo (a) subsequent treatment(s) such as crosslinking treatment and post-foaming treatment. In producing a foamed article in the above-mentioned manner, an (A-2) component is added to an (A-1) component and the mixture may be used as the (A) component, or an (A-2) component may be added to an (A-1) component before or after the injection of a (B) component during the process of producing a foamed article.

FIG. 1 shows a production line for a cable insulated with a foam having a high expansion ratio, which is one embodiment of the extrusion foaming of the present invention.

An (A) component with or without a (C) component, and/or a nucleator to be added as necessary are(is) fed into a first extruder 4 and melted in the extruder. A (B) component is forced into the extruder 4 through a pump 3 and thoroughly mixed with a molten substance of the above component(s).

The temperature and pressure in the first extruder 4 vary depending on the resin and the foaming agent to be used. Generally, the temperature is 140°–240° C., preferably 150°–230° C. and the pressure is 80–120 atm, preferably 50–150 atm. When HDPE and LDPE are used, for example, the temperature is preferably adjusted to 180°–210° C. and the pressure to 50–150 atm. When the (A) is polyethylene added with OBSH as a chemical foaming agent, the temperature is preferably adjusted to 150°–170° C. and the pressure to 100–150 atm. When the (A) is polyethylene added with ADCA, the temperature is preferably adjusted to 200°–230° C. and the pressure to 100–150 atm.

While the pressure when the (B) component is pressed into the extruder also varies as above, it is generally 100–200 atm, preferably about 150 atm.

A foamable composition of (A) with or without a (C) component, and a (B) component is thoroughly mixed in the first extruder 4 and transferred to a second extruder 5. The composition expands as extruded from a die 6. It is preferable that the temperature of the foamable composition should be adjusted to a temperature a little higher than the melt temperature of the organic polymer at just before the die 6 so that the cells in adjacency may not coalesce immediately after foaming to become bulky. For example, when HDPE and LDPE are used, the temperature is preferably adjusted to 130°–140° C. and the pressure in the extruder 5 is preferably adjusted to 30–50 atm.

A conductor supplied from a conductor supplier 1 is preferably preheated by a preheater 2 and supplied into the extruder 5.

The foamable composition in the second extruder 5 is released from the die 6, delivered around the conductor supplied through a core part of the die 6 and is foamed as it is press-adhered to the conductor.

Figure 2:
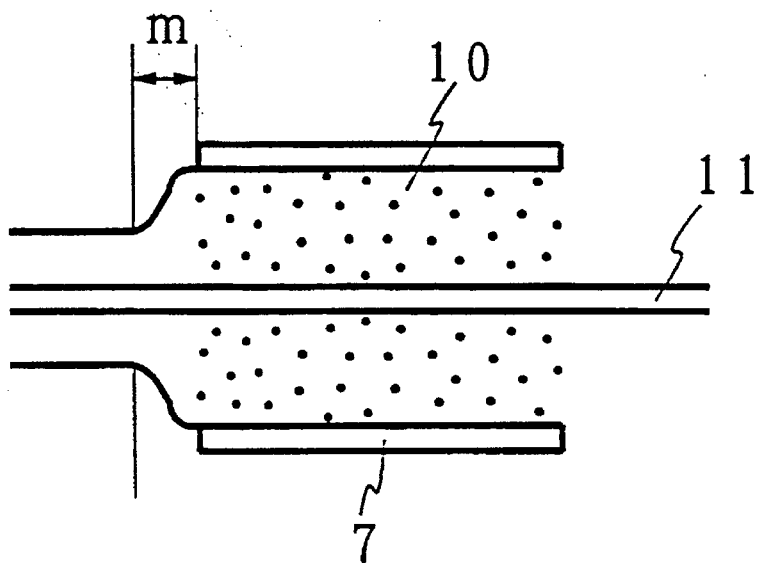
FIG. 2 shows a discharge end of a die and a sizing die of FIG. 1.

FIG. 2 shows a discharge end of the die and a sizing die 7 of FIG. 1.

When argon is used as (B), the foamable composition foams immediately after it exits the die 6 and when left as it is, the obtained foam shrivels. Accordingly, the sizing die 7 is preferably set as close as possible to the discharge end of the die 6, such that overfoaming is prevented and the foamed layer maintains a certain thickness. When the conductor is an electric wire, a distance m between the outlet of the die 6 and the sizing die 7 is about 0.5–10 cm, particularly about 1–5 cm. When m is less than 0.5 cm, the foamed article has a rough surface. When it exceeds 10 cm, the foamed article shrivels and fails to achieve a sufficient expansion ratio.

The surface of the foamed layer which exits the die 6 may be lightly air-blown before being fed into the sizing die 7 so that the surface can be solidified. The thus-obtained foamed layer 10 has a smooth surface and the desired foamed article with a high expansion ratio is easily obtained. The sizing die 7 is generally a stainless pipe and is not necessarily cooled.

Instead of passing the formed layer through the sizing die 7, an air may be blown thereto to allow solidification of the layer immediately after discharge of the composition, and then the layer may be cooled.

Figure 3:
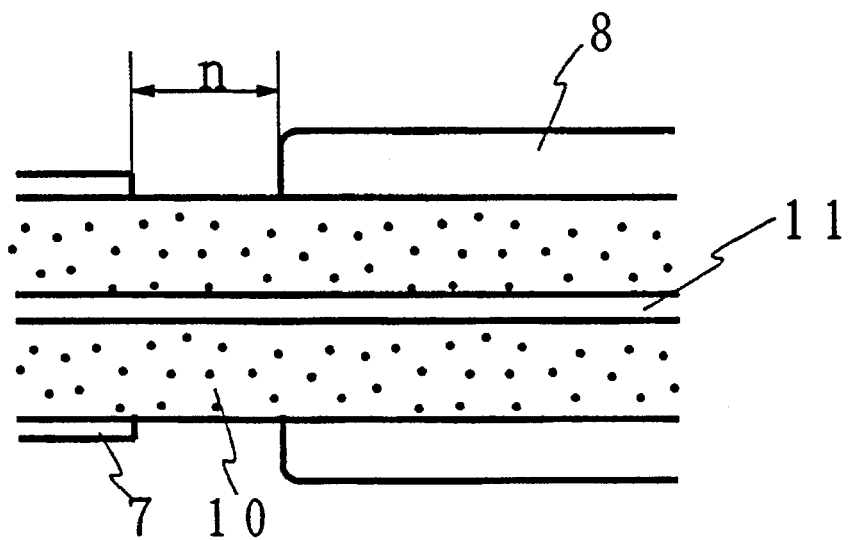
FIG. 3 shows a sizing die and a cooling device of FIG. 1.

The conductor 11 covered with the foamed layer 10 and discharged from the sizing die 7 is cooled (for example, with water, cooled gas, or the like) at a certain distance from the die 7, as shown in FIG. 3. The distance between the discharge end of the sizing die 7 and a cooler 8 is generally 1–3 m in the case of an electric wire coating. Then, the conductor is wound up at a conductor take-up part 9.

The foamed layer 10 may be directly formed on the conductor 11. Alternatively, a thin film of an unfoamable organic polymer may be applied in advance around the conductor 11 for an improved adhesion between the foamed layer 10 and the conductor 11 and a foamed layer may be applied thereon.

Note that a foamed article having an expansion ratio of not less than 75% and superior electrical characteristics can be obtained according to the present invention, even when a compound foamable to 50% or more as described above is not used, by using a specific nucleator and a physical foaming agent. Such foamed article is preferably used as an insulation for a coaxial cable, particularly a coaxial cable for high frequency waves. A method for producing such foamed article is explained in the following.

As a nucleator, (an) organic and/or inorganic powder(s) having an average particle size of, for example, not more than 50 μm, specifically 0.1–20 μm, more specifically 0.1–10 μm, and a tan δ increase of not more than $0.3\times10^{-4}$, preferably not more than $0.2\times10^{-4}$ are(is) used.

The tan δ increase is measured by the method below.

A test nucleator (2 parts by weight) is admixed with polyethylene (100 parts by weight) having a tangent of dielectric loss angle δ, i.e. tan δ, at 20° C. and 1.0 GHz of from $1.0\times10^{-4}$ to $2.0\times10^{-4}$ to give a homogeneous mixture. The mixture is extrusion coated on a conductor to form an unfoamable insulation, on which an outer conductor is formed to give a test coaxial cable having an outer conductor diameter of 1 mm and an insulation thickness of 5 mm. On the other hand, a control coaxial cable having the same size and structure as above except that a nucleator is not added is prepared. With respect to the both cables, transmission loss of each cable at the same temerature and the same frequency as above is measured, based on which tan δ of the insulation is estimated by a known calculation method.

That is, tan δ is calculated according to the formulas as shown in *Densen Yoran*, 6th ed., Mitsubishi Cable Industries, Ltd., Patent & Technology Administration Dept., page 1012. Then, a tan δ increase is calculated by the following formula.

tan δ increase=tan δ of test coaxial cable–tan δ of control coaxial cable

Examples of the nucleator satisfying the aforementioned requirements include BN, $ZnO_2$ and MgO, with particular preference given to BN.

As the physical foaming agent and the organic polymer to be foamed, the aforesaid physical foaming agent (B) and the organic polymer (A-1) may be used respectively and the explanations therefor regarding general aspects, preferable modes, explanation of the amounts to be used etc. are also applicable here. In addition, the same production method for a foamed article as described in the foregoing applies here.

The amount of the nucleator to be used when a compound foamable to 50% or more is not used is 0.3–10 parts by weight, preferably 0.8–5 parts by weight, more preferably 0.9–1.5 parts by weight per 100 parts by weight of the organic polymer.

While the present invention is described in detail by illustration of examples in the following, the present invention is not limited to these examples.

EXAMPLE 1

Using a production line for foam-insulated cables, DFDJ 4960 (a 50% foamable compound, manufactured by Nippon Unika, Japan) containing a low density polyethylene (density: 0.925 g/cm³) and OBSH as a chemical foaming agent; and a high density polyethylene (density: 0.946 g/cm³) were melted and mixed at a ratio of 50:50 (by weight), the mixture of polyethylenes having a swelling ratio of 54, and argon was forced therein as a physical foaming agent at 0.2 part by weight based on 100 parts by weight of the polyethylene. The composition was extrusion foamed on a copper wire (9.6 mm) under the following extrusion conditions.

Inner temperature of the first extruder (65 mm): 160°–170° C.

Inner temperature of the second extruder (90 mm): 150°–135° C.

To the copper wire applied with a foamed layer which came out of the die was blown a cooling air so as to solidify the surface of the foamed layer and the wire was passed through a cooling water tank and wound up. The outer diameter of the foam-insulated cable obtained was 22 mm.

EXAMPLE 2

In the same manner as in Example 1 except that WN-866 [70% foamable compound of a low density polyethylene (density: 0.923 g/cm³), manufactured by Nippon Unika, Japan] was used as an (A) component in place of the 50% foamable compound, a foam-insulated cable was produced.

EXAMPLE 3

In the same manner as in Example 2 except that a mixture of argon and carbon dioxide (50:50, volume ratio) was used as a physical foaming agent (B), a foam-insulated cable was produced.

COMPARATIVE EXAMPLE 1

In the same manner as in Example 1 except that a low density polyethylene (density: 0.925 g/cm$^3$) was used in place of the 50% foamable compound and silicon oxide was used as a nucleator at 0.5 part by weight based on 100 parts by weight of the polyethylene, a foam-insulated cable was produced.

With regard to the foam insulated cables obtained in Examples 1–3 and Comparative Example 1, the expansion ratio of the foamed layer, average cell diameter and VSWR characteristic, bending diameter upon buckling and attenuation of the cables were measured. The bending diameter upon buckling is a diameter of a mandril when a foam insulated cable (outer diameter: 22 mm) wound therearound developed buckling. The results are shown in Table 1.

The expansion ratio of DFDJ-4960, a 50% foamable compound used in Example 1, and WN-866, a 70% foamable compound used in Examples 2 and 3, was measured as in the following.

DFDJ-4960 and NN-866 were extrusion foamed with an extruder having an L/D of 20 without using physical foaming agents under the extrusion conditions of cylinder temperature: 165° C., temperature near die: 130° C., screw rotation: 20 rpm and screw: full flight screw. DFDJ-4960 showed an expansion ratio of 50.2% and WN-866 showed an expansion ratio of 70.3%.

TABLE 1

| | Expansion ratio (%) | Average cell diameter (μm) | Bending diameter upon buckling (cm) | VSWR characteristic (100 MHz–2 GHz) | Attenuation 2 GHz (dB/km) |
|---|---|---|---|---|---|
| Ex. 1 | 77 | 300 | 5 | 1.05 | 66.3 |
| Ex. 2 | 78 | 280 | 5 | 1.04 | 65.8 |
| Ex. 3 | 80 | 350 | 6 | 1.06 | 65.0 |
| Comp. Ex. 1 | 73 | 800 | 13 | 1.15 | 70.1 |

EXAMPLES 4–12, COMPARATIVE EXAMPLE 2

In the same manner as in Example 1 except that DFDJ-4960 and a high density polyethylene (density: 0.943 g/cm$^3$) were used at a ratio (weight ratio) as shown in Table 2, foam-insulated cables were produced. In Comparative Example 2, silicon oxide was used as a nucleator at 0.5 part by weight relative to 100 parts by weight of HDPE.

The expansion ratio of the foamed layer, appearance and average cell diameter of each cable were examined. The results are shown in Table 2.

TABLE 2

| | Ratio: (A) & (C) | | Evaluation of foamed article | | |
|---|---|---|---|---|---|
| | DFDJ-4960 | HDPE | Expansion ratio (%) | Appearance | Average cell diameter (μm) |
| Example 4 | 100 | 0 | 75 | Δ | 523 |
| Example 5 | 85 | 15 | 78 | ○ | 491 |
| Example 6 | 75 | 25 | 78 | ○ | 358 |
| Example 7 | 65 | 35 | 79 | ○ | 136 |
| Example 8 | 55 | 45 | 80 | ○ | 75 |
| Example 9 | 45 | 55 | 80 | ○ | 82 |
| Example 10 | 35 | 65 | 78 | ○ | 166 |
| Example 11 | 25 | 75 | 76 | ○ | 317 |
| Example 12 | 15 | 85 | 76 | ○ | 384 |
| Comp. Ex. 2 | 0 | 100 | 73 | Δ | 853 |

Note:
ratio = weight ratio
appearance: ○ = fine, Δ = rather rough, X = rough

EXAMPLES 13–21

Using the same production line for foam-insulated cable as used in Example 1, foam-insulated cables having the same structure were produced under the same conditions except that a low density polyethylene (density: 0.925 g/cm$^3$) and a high density polyethylene (density: 0.943 g/cm$^3$) were used as polyethylenes to be foamed at a ratio as shown in Table 3 and BN used as a nucleator was added in a hopper of extruder along with the above-mentioned polyethylenes in the form of a masterbatch. The expansion ratio of the foamed layer, appearance and average cell diameter of each cable are shown in Table 3.

TABLE 3

| | Ratio | | | Evaluation of foamed article | | |
|---|---|---|---|---|---|---|
| | LDPE | HDPE | BN | Expansion ratio (%) | Appearance | Average cell diameter (μm) |
| Example 13 | 100 | 0 | 0.5 | 76 | ○ | 218 |
| Example 14 | 50 | 50 | 0.5 | 79 | ○ | 147 |
| Example 15 | 0 | 100 | 0.5 | 77 | ○ | 178 |
| Example 16 | 100 | 0 | 1.0 | 78 | ○ | 151 |
| Example 17 | 50 | 50 | 1.0 | 81 | ○ | 83 |
| Example 18 | 0 | 100 | 1.0 | 79 | ○ | 98 |
| Example 19 | 100 | 0 | 2.0 | 75 | ○ | 272 |
| Example 20 | 50 | 50 | 2.0 | 76 | ○ | 294 |
| Example 21 | 0 | 100 | 2.0 | 76 | ○ | 305 |

Note:
ratio = weight ratio
appearance: ○ fine, Δ = rather rough, X = rough

According to the present invention, a compound (A) foamable to 50% or more or a mixture of the (A) and an unfoamable organic polymer (C), and a rare gas and/or carbon dioxide as a physical foaming agent (B) successfully afford a foamed article having a uniform and fine foam structure and a high expansion ratio of not less than 75% (which is as high as when freon gas is used), without causing environmental problems such as depletion of the ozone layer. When applied, in particular, to a foamed layer for an insulated conductor, such as foam-insulated electric wire which is required to have high performance insulation and is occasionally installed under severe conditions, the composition of the present invention advantageously provides an insulated conductor with no potential buckling.

What is claimed:

1. A foamable organic polymer composition comprising a mixture of organic polymers, at least one member selected from the group consisting of organic fine powder and an inorganic fine powder having a tan $\delta$ increase of not more than $0.3 \times 10^{-4}$ as a nucleator in a proportion of 0.3–10 parts by weight based on 100 parts by weight of said mixture of organic polymers, and at least one member selected from the group consisting of rare gases and carbon dioxide as a physical foaming agent; said mixture comprising a low density polyethylene having a density falling within the range of from 0.89 to 0.935 and a high density polyethylene having a density falling within the range of from 0.94 to 0.96; and the weight ratio of the low density polyethylene; the high density polyethylene is from 100:10 to 10:100.

2. A method for producing a foamed article with a high expansion ration, comprising mixing, as a physical foaming agent, at least one member selected from the group consisting of rare gases and carbon dioxide with an organic polymer mixture, and a nucleator added in a proportion of 0.3–10 parts by weight based on 100 parts by weight of said organic polymer mixture, to allow foaming of said organic polymer mixture, said nucleator being at least one member selected from the group consisting of organic fine powder and an inorganic fine powder having a tan $\delta$ increase of not more than $0.3 \times 10^{-4}$; and said mixture comprising a low density polyethylene having a density falling within the range of from 0.89 to 0.935 and a high density polyethylene having a density falling within the range of from 0.94 to 0.96; and the weight ratio of the low density polyethylene; the high density polyethylene is from 100:10 to 10:100.

3. The foamable organic polymer composition of claim 1, wherein the inorganic fine powder is boron nitride.

4. The method for producing a foamed article with a high expansion ratio of claim 2, wherein the inorganic fine powder is boron nitride.

5. The foamable organic polymer composition of claim 1, wherein the composition obtains an expansion ratio of not less than 78% based on the density of said mixture of organic polymers before and after foaming.

6. The method for producing a foamed article with a high expansion ratio of claim 2, resulting in a foamed article having an expansion ratio of not less than 78% based on the density of said organic polymer mixture before and after foaming.

* * * * *